United States Patent [19]

Corretja

[11] Patent Number: 5,102,754
[45] Date of Patent: Apr. 7, 1992

[54] NEGATIVE CADMIUM-BASED ELECTRODE FOR NON-SEALED ALKALINE STORAGE CELL

[75] Inventor: Sylvie Corretja, Pessac, France
[73] Assignee: Saft, S.A., Romainville, France
[21] Appl. No.: 515,622
[22] Filed: Apr. 27, 1990
[30] Foreign Application Priority Data
Apr. 28, 1989 [FR] France .................. 89 05696
[51] Int. Cl.$^5$ .................. H01M 4/90; H01M 4/36
[52] U.S. Cl. .................. 429/222; 429/40
[58] Field of Search .................. 429/222, 40
[56] References Cited
U.S. PATENT DOCUMENTS

| | | | |
|---|---|---|---|
| 2,988,585 | 6/1961 | Peters | 429/222 |
| 3,502,506 | 3/1970 | Broyde | 429/40 |
| 3,505,118 | 4/1970 | Mehra et al. | 429/40 |
| 3,733,344 | 6/1973 | Benda et al. | 429/40 |
| 3,837,919 | 9/1974 | Gutrdige | 429/222 |
| 4,430,391 | 2/1984 | Ovshinsky | 429/40 |

FOREIGN PATENT DOCUMENTS

| | | | |
|---|---|---|---|
| 0041433 | 4/1979 | Japan | 429/222 |
| 0038568 | 3/1982 | Japan | 429/222 |

*Primary Examiner*—Brian E. Hearn
*Assistant Examiner*—Maria Nuzzolillo
*Attorney, Agent, or Firm*—Kenyon & Kenyon

[57] ABSTRACT

Negative cadmium electrode for a non-sealed alkaline storage battery comprising a metal support to which is bonded an active paste containing a cadmium-based active material and a binder. The active paste additionally includes a material that acts as a hydrogen releasing catalyst, in a proportion of 0.2 percent to 25 percent by weight of the paste.

6 Claims, No Drawings

NEGATIVE CADMIUM-BASED ELECTRODE FOR NON-SEALED ALKALINE STORAGE CELL

This invention relates to a negative cadmium-based electrode for a non-sealed alkaline storage cell and, more particularly, an electrode of the type which is consolidated using a polymer.

Such an electrode comprises a metal support to which is bonded an active paste containing the active material and a binder which is perfectly stable in the electrolyte. The manufacture of such electrodes is more particularly described in French Patent FR-A-2586 407.

It is known that, in a non-sealed alkaline storage battery, for example in a nickel-cadmium storage battery, the competition between nickel oxidation and oxygen release results in an output charge which is less for the positive electrode than for the negative electrode. This output also decreases as the charging current is lowered. When the negative electrode is consolidated using a polymer, the end of charge voltage of this electrode is particularly high. In applications wherein the storage batteries are charged at a constant voltage, the result is a very low end of charge current. Thus, the state of charge of the positive electrode is altered and a rapid reduction in the live load of the storage batteries is observed.

An object of this invention is to provide a negative cadmium-based electrode for a non-sealed alkaline storage battery designed to reduce the hydrogen overvoltage on this electrode when it is fully charged.

Another object of this invention is to provide a negative cadmium-based electrode for a non-sealed alkaline storage battery, comprising a metal support to which is bonded an active paste containing the active cadmium-based material and a binder, characterized in that said active paste additionally contains a material which will act as a hydrogen releasing catalyst, in a proportion of 0.2 percent to 25 percent by weight of said paste, wherein said material is selected from the group consisting of titanium, tungsten carbide; alloys of nickel-molybdenum, cobalt-molybdenum, and nickel-molybdenum-vanadium; iron oxides; molybdenum oxides; nickel ferrites; nickel molybdenate; and cadmium molybdate.

If said material is titanium, said proportion preferably ranges from 2 percent to 25 percent of said paste.

If said material is selected from the group consisting of tungsten carbide and the alloys of nickel-molybdenum, cobalt-molybdenum, and nickel-molybdenum-vanadium, said proportion preferably ranges from 0.5 percent to 5 percent.

If said material is selected from the group consisting of the oxides of iron or molybdenum, the nickel ferrites, and nickel or cadmium molybdate, said proportion preferably ranges between 0.2 percent and 5 percent.

Said material may be introduced into the active paste either in the form of a powder or by electrochemical depositing techniques.

Other characteristics and advantages of this invention shall be made apparent in the following description of embodiments which are provided as non-limiting examples.

EXAMPLE 1

Prior Art

A non-sealed nickel-cadmium battery of the prior art comprises sintered positive electrodes and negative electrodes that are consolidated using a plastic binder in accordance with aforesaid French Patent FR-A-2856 407.

The active paste of the negative electrode contains:

| | |
|---|---|
| active material CdO + Cd | 92% to 97% |
| additives | 3% to 5% |
| solidifier | 0.3% to 3% |
| carboxylated copolymer of butadiene styrene | 0.5% to 3% |

Such a storage battery is exposed to 195 charging-discharging cycles performed with a constant charging voltage of 1.425 volts and a discharge depth of 16.5 percent.

The restored capacity of the storage battery is 26 percent.

EXAMPLE 2

In accordance with the invention, tungsten carbide in the proportion of 2 percent by weight is introduced in the active paste of the storage battery of Example 1.

The resulting storage battery, cycled under the same considerations as in the aforesaid, displays a restored capacity of 58 percent.

EXAMPLE 3

In accordance with the invention, 1 percent nickel ferrite is incorporated into the active paste of the storage battery of Example 1. After 195 charging-discharging cycles, performed under a constant charging voltage of 1.425 volts, the restored capacity of the storage battery is 38 percent.

Of course, the invention is not limited to the embodiments described in the foregoing.

The quantity of hydrogen releasing catalyst may vary within the limits described in the foregoing.

The minimum quantity is established such that adequate efficiency is obtained. This quantity should not be substantially increased, because insofar as the catalyst is substituted for the active material in the electrode, this would result in a decreased capacity for the electrode.

I claim:

1. A negative cadmium-based electrode for a non-sealed alkaline storage battery, comprising a metal support to which is bonded an active paste containing a cadmium-based active material and a binder, wherein the improvement comprises said active paste additionally including a material which acts as a hydrogen releasing catalyst, in a proportion of 0.2 percent to 25 percent by weight of said paste, said material being selected from the group consisting of titanium; tungsten carbide; the alloys nickel-molybdenum, cobalt-molybdenum, and nickel-molybdenum-vanadium; iron oxides; nickel ferrites; and nickel molybdenate, and cadmium molydate.

2. A negative cadmium-based electrode for a non-sealed alkaline storage battery, comprising a metal support to which is bonded an active paste containing a cadmium-based active material and a binder, wherein the improvement comprises said active paste additionally including a material which acts as a hydrogen releasing catalyst, said material being titanium in a proportion ranging from 0.5 percent to 5 percent by weight of said paste.

3. A negative cadmium-based electrode for a non-sealed alkaline storage battery, comprising a metal support to which is bonded an active paste containing a cadmium-based active material and a binder, wherein the improvement comprises said active paste additionally including a material which acts as a hydrogen releasing catalyst, said material being selected from the group consisting of tungsten carbide and the alloys nickel-molybdenum, cobalt-molybdenum, and nickel-polybdenum-vanadium, in a proportion ranging from 0.5 percent to 5 percent by weight of said paste.

4. A negative electrode according to claim 1, wherein said material is selected from the group consisting of the oxides of iron; the nickel ferrites; and nickel and cadmium molybdates, in a proportion ranging from 0.2 percent and 5 percent.

5. A process of making a negative electrode as claimed in any one of the foregoing claims, wherein the improvement comprises introducing said material in said paste in powder form.

6. A process of making a negative electrode as claimed in any one claims 1 to 4, wherein the improvement comprises introducing said material into said paste by electrochemical deposition techniques.

* * * * *